J. E. GRAYBILL.
AUTOMATIC STEM MAKING MACHINE.
APPLICATION FILED OCT. 17, 1908.

1,019,457.

Patented Mar. 5, 1912.
9 SHEETS—SHEET 1.

Fig. 1.

Witnesses:
Irving E. Steers.
J. Ellis Ely

Inventor
John E. Graybill,
by Allen S. Davis,
Att'y

J. E. GRAYBILL.
AUTOMATIC STEM MAKING MACHINE.
APPLICATION FILED OCT. 17, 1908.

1,019,457.

Patented Mar. 5, 1912.
9 SHEETS—SHEET 2.

Witnesses:
Irving E. Steers.
J. Ellis Ellen

Inventor
John E. Graybill,
by [signature]
Att'y.

J. E. GRAYBILL.
AUTOMATIC STEM MAKING MACHINE.
APPLICATION FILED OCT. 17, 1908.

1,019,457.

Patented Mar. 5, 1912.
9 SHEETS—SHEET 4.

Fig. 12.

Witnesses:
Irving E. Sturs.
J. Ellis Glen

Inventor
John E. Graybill,
by
Atty.

J. E. GRAYBILL.
AUTOMATIC STEM MAKING MACHINE.
APPLICATION FILED OCT. 17, 1908.

1,019,457.

Patented Mar. 5, 1912.
9 SHEETS—SHEET 7.

Witnesses:
Irving E. Steers
J. Ellis Elm

Inventor
John E. Graybill,
by
Att'y.

UNITED STATES PATENT OFFICE.

JOHN E. GRAYBILL, OF YORK, PENNSYLVANIA, ASSIGNOR TO GENERAL ELECTRIC COMPANY, A CORPORATION OF NEW YORK.

AUTOMATIC STEM-MAKING MACHINE.

1,019,457.

Specification of Letters Patent.

Patented Mar. 5, 1912.

Application filed October 17, 1908. Serial No. 458,209.

*To all whom it may concern:*

Be it known that I, JOHN E. GRAYBILL, a citizen of the United States, residing at York, county of York, State of Pennsylvania, have invented certain new and useful Improvements in Automatic Stem-Making Machines, of which the following is a specification.

This invention relates to machines for making stems for incandescent lamps, and more particularly to automatic stem making machines for inserting anchor wires and leading-in wires and sealing them in place to make a complete stem.

The object of the invention is to provide a machine of this character which shall be entirely automatic in its operation and in which the various steps may be carried out without the exercise of any particular skill on the part of the operator.

In carrying out my invention, an automatic mechanism is actuated in proper sequence to feed the stems into the machine, place the leading-in wires and the anchor wires in position, seal the wires into the glass to complete the stem, and finally remove the completed stem from the machine. The stems are preferably flanged when they are placed in the machine, and after the stems are in position the feed mechanism for the leading-in wires measures and cuts off the required length of leading-in wire from a continuous length, and places it in the stem; the stem is then heated and another mechanism places the anchor wire, which is also cut off from a continuous length of wire, in position, at the same time sealing all wires into the glass and completing the stem, and finally the discharge mechanism lifts the completed stem out of the machine and delivers it where desired. Various forms of automatic devices for carrying out these steps may be used, and the particular forms preferred are more fully hereinafter described.

The invention will best be understood in connection with the accompanying drawings which are merely an illustration of one embodiment of my invention and in which—

My invention may be embodied in many different forms, but the machine shown in the drawings has a table 1 on which the operating parts of the machine are mounted and held in proper relation to each other by an L-shaped base-plate 2 firmly attached to the table. The moving parts of the machine are supported upon an annular pedestal 3 secured to the base-plate 2 and carrying a rotatable frame 4 in the shape of a wheel, which rotates upon a ball bearing 5 between the frame and the pedestal and is held in position by means of a fixed post or axle 6 passing through the pedestal and through the hub 7, from which spokes or arms 8 extend, each arm having at the outer end a boss 9 which carries an operating head and also forms a bearing for a rotatable driving shaft for the head. The ends of the spokes or arms are connected together by a rim 10, and while any suitable driving means may be used to impart motion to the frame 4, the preferred arrangement comprises a friction-wheel 11 mounted to frictionally engage the rim and thereby drive the frame 4. The friction wheel 11 is keyed to a vertical driving shaft 12 journaled in a bearing 13 pivotally mounted upon the baseplate 2, and is yieldingly held in contact with the rim 10 by means of a spring 14 having one end attached to a fixed stud or support on the frame 1 and the other end to a collar 15 loosely mounted on the shaft 12 near the lower end. The driving shaft 12 is driven from the lower end by two driving pulleys 16 engaged by a belt which passes around one of the pulleys 16, thence around another pulley 17 mounted on the lower end of the shaft of another friction wheel 11 placed 90 degrees from the first, thence around a pulley 18 and around the other one of the pulleys 16 back to the pulley 19. The two pulleys 18 and 19 which drive the belt are carried on the hub of a large driving pulley 20 which is rotatably mounted upon a stud 21 carried upon the table 1, and is driven from any suitable source of power by a belt passing over idler pulleys 22.

Figure 2:
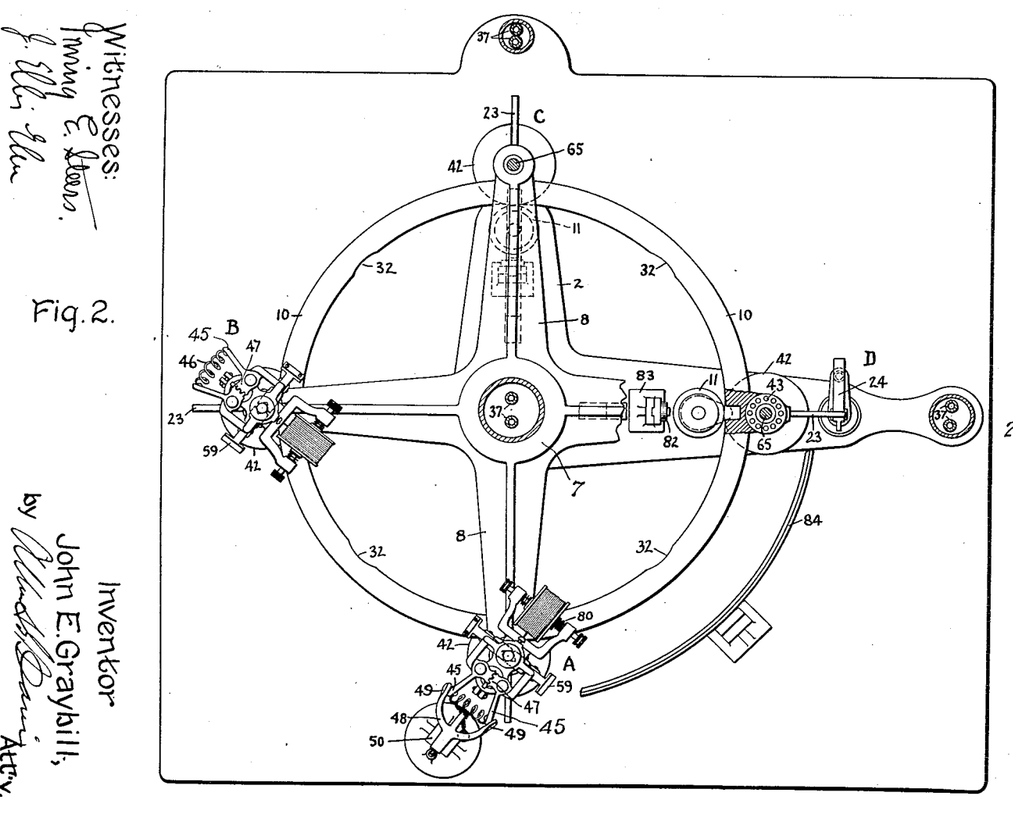
Fig. 2 a top plan view of the machine shown in Fig. 1, two of the operating heads and all of the burners being omitted and one operating head being shown in section.
Figure 3:
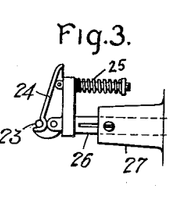
Fig. 3 a side view of a stop.

In the operation of the machine it is necessary that each movable operating head which acts as a holder for maintaining the component parts of a stem in proper relation to each other and which carries the glass tube to which the wires are to be attached, should stop for a definite length of time in such a position that the flame of the burners can play upon the tube and raise it to the proper temperature. The frame 4 is brought to rest with an operating head in the proper position by any suitable positive stop, which may be controlled either by hand or automatically. In the machine shown in the drawings the stop mechanism comprises radially extending studs 23 extending from each boss 9 and coöperating with a catch 24 yieldingly held in operative position by any suitable means, such as a spring 25, and pivotally mounted on a vertically-movable head 26, which slides in a guide 27 and is normally held with the catch in operative position by a spiral spring 28 surrounding an operating rod 29 attached to the head 26. As the frame 4 rotates each stud 23 is caught and held by the catch 24 until released when the head 26 is drawn downward, either automatically or, as shown in the drawings, by means of a bell-crank lever 30 with one arm connected to the rod 29 and the other arm carrying a disk 31 adapted to be engaged by the knee of the operator. The operator can stop the machine with the heads midway between their normal positions for which purpose, as shown in Fig. 2, recesses 32 are cut in the rim midway between the ends of the spokes or arms 8 deep enough to permit the friction wheels to revolve without moving the frame. The frame will remain stationary if it is stopped by hand when the friction wheel 11 is opposite one of these recesses, but in the normal operation of the machine the momentum of the moving frame 4 is sufficient to carry the recesses 32 past the friction wheel and thereby prevent the recesses from stopping the machine.

Figure 1:
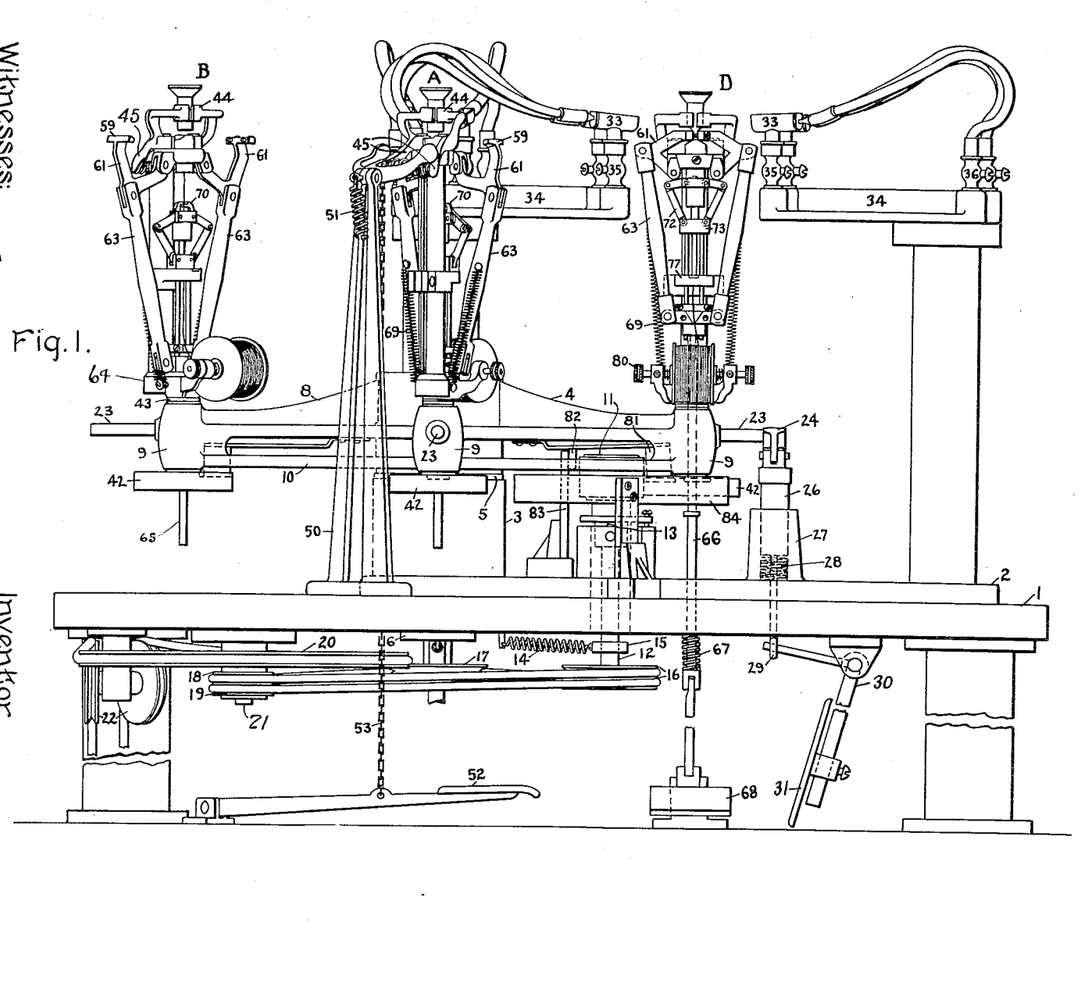
Figure 1 is a side view of the machine showing one operating head between the burners and the parts in position to seal the anchor wire into the stem, and with another operating head in the position in which a new stem is to be inserted.

After the wires have been inserted and are positioned inside the glass tube in the holder the tube must be heated until the glass can be pressed down upon them to make a hermetical seal. The tube is heated between two sets of burners 33, best shown in Fig. 1, carried upon journaled brackets 34 each movable about its support as an axis and divided into two chambers, one for supplying gas and the other for supplying compressed air to the burners. Valves 35 support the burners and also control the amount of gas supplied to them, while the air supply is controlled by valves 36. The chambers in the brackets 34 are supplied with air and gas through two sets of suitable supply pipes 37, one set passing through the vertical post 6, as shown in Figs. 1 and 2, and the other set through the support for the outer burners.

Figure 4:
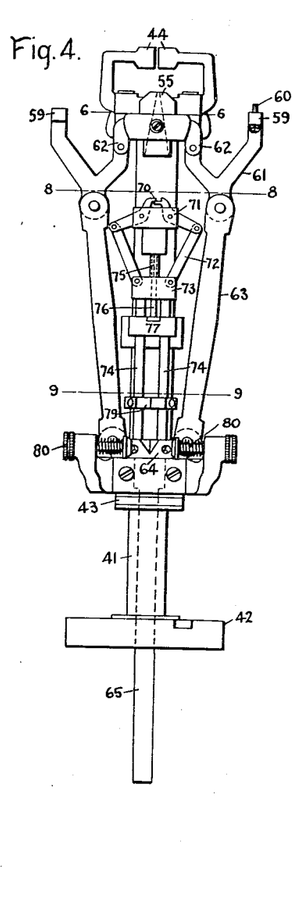
Fig. 4 a side view of one of the operating heads.
Figures 5, 6, 7, 8, 9, 10, 11:
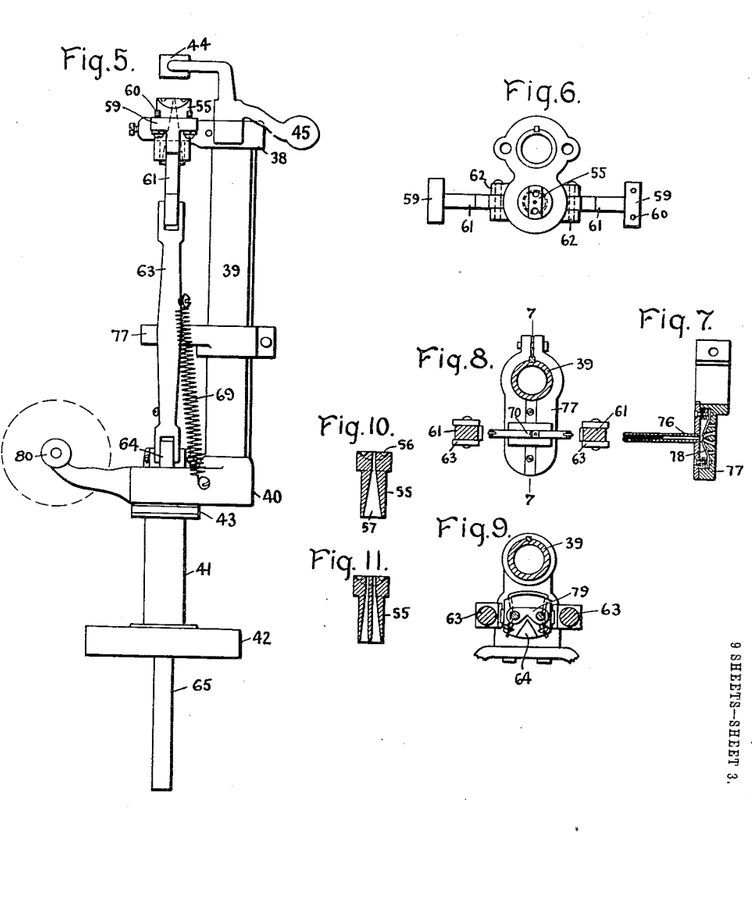
Fig. 5 a view of the operating head shown in Fig. 4, and at right angles to the view shown in Fig. 4.
Fig. 6 a section on the line 6, 6, of Fig. 4.
Fig. 7 a section on the line 7, 7, of Fig. 8.
Fig. 8 a section on the line 8, 8, of Fig. 4.
Fig. 9 a section on the line 9, 9, of Fig. 4.
Fig. 10 a section of the guide through which the anchor wire is moved to position in the stem.
Fig. 11 a section of a similar guide used when two wires are inserted in the stem.

An operating head, which comprises a holder for holding the glass tube with the leading-in wires in position and mechanism for automatically introducing an anchor wire into position in the tube and then pressing the sides of the tube to seal the wires in position, is rotatably mounted upon each boss 9. The operating heads are best shown in Figs. 4 and 5 and each one comprises a top 38 attached to the upper end of a vertical standard 39 mounted on a foot piece 40 to form a frame-work rotated by a hollow driving shaft 41 having on the lower end a driving wheel 42, preferably in the form of a friction wheel mounted to project slightly beyond the inner edge of the rim 10 to engage and be driven by the friction wheel 11 when the frame is stationary in one of its normal positions, as shown in Fig. 2. The revolving head is held in position and its weight is carried by the bearing 43, which may be either a ball bearing or a bearing of the usual type.

The tube to which the anchor wire is to be attached is held in position on the operating head between two spring-pressed jaws 44, each of which is mounted upon one end of a member pivoted on the top 38 and having the opposite end formed into a handle 45, both handles being engaged by a spring 46, as shown in Fig. 2, which tends to hold the jaws 44 in engagement, while segmental gears 47 attached to the members on which the jaws are mounted mesh with each other to insure equal movements of the two jaws. The jaws 44 are opened by pressing the handles 45 together either by hand or automatically, and the arrangement which I have shown in the drawings for this purpose consists of a fork 48, shown in Figs. 1 and 2, provided with prongs 49 for engaging and pressing together the handles 45, thereby opening the jaws 44. The fork may be operated automatically or by hand, and in the manually-controlled form shown in Figs. 1 and 2 the fork is movably mounted with reference to the handles 45, preferably by being pivoted to a standard or support 50, as shown in Fig. 1, and normally held in inoperative position and out of range of movement of the handles 45 by a spring 51. The operator can depress the fork into engagement with the handles 45 and thereby open the jaws 44 by means of a pedal 52 beneath the table and connected to the fork by a chain 53. After the tube has been placed in position and is held by the jaws 44 one or more anchor wires may be inserted in the tube, and in either case the anchor wire is fed up through a guide block 55 adjustably held in position on the head 38 by a set screw and provided with notches 56, which receive the lower edge of the tube and position it on the guide block. The anchor wire is brought into the interior of the tube in proper position to be sealed into said tube by means of a conical guide channel 57, which opens between the notches 56. Where two lead wires are to be attached to the tube, the guide block 55 contains two guide channels, as shown in Fig. 11.

When the anchor wire is in proper relation to the tube and the glass of the tube is at the proper temperature the sides of the tube are squeezed together to seal the wire in position. Various means may be used for accomplishing this result, but the preferred mechanism, as shown in the drawings, comprises coöperating forming dies 59 which approach each other to squeeze the tube. One of the forming dies is provided with adjusting screws 60 for regulating the space between them, and both dies are mounted on arms 61 pivoted to ears 62 on the head 38 and moved by actuating rods 63 pivotally connected both to the arms 61 and to a vertically movable crosshead 64 which is actuated and guided by a sliding rod 65 passing through the hollow shaft 41. When the cross-head 64 is raised by means of the sliding rod 65 mounted to slide in the hollow shaft 41, the parts assume the position of the head shown in position D in Fig. 1, with the forming dies 59 pressing the end of the tube into proper form and sealing the anchor wires in position. The cross-head 64 is raised at the proper time by means of an actuator 66, which is normally held in inoperative position by a coil spring 67 between a collar on the actuator 66 and the lower surface of the table, and is moved either automatically or by the operator to lift the cross-head 64. In the manually-controlled form of machine shown in Figs. 1 and 2 the operator can bring the end of the actuator 66 into engagement with the sliding rod 65 by means of a pedal 68 and thereby raise the sliding rod and the cross-head 64 to cause the two forming dies to approach each other. In either the automatic or manual machine the forming dies are pulled back into normal position by springs 69 secured to the foot-piece 40 and to the actuating rods 63.

The anchor wire is cut off to the proper length and placed in position to be sealed into the tube by a mechanism comprising cutters 70 pivoted on a vertically-movable head 71 and connected at one end to links 72, which in turn are pivoted to a vertically-movable, positively-actuated cross-head 73 carried upon two rods 74 on the cross-head 64, so that the cross-head 73 is rigidly attached to and moves with the cross-head 64. This arrangement normally holds the cutters in the position shown in Fig. 4, out of the range of the burners, and lifts the cutters into the position shown on the right in Fig. 1 only for the instant required to cut the anchor wire. The cutters are therefore protected from the heat of the burners and last much longer than would be the case if they were permanently in cutting position. A tubular guide 75 on the cross-head 73 positions the head 71 and permits it to move vertically with reference to the cross-head, and the anchor wire is fed up between the cutters 70 by a stationary guide tube 76 telescoping within the guide 75 and forming a guide for the cross-head 73 by extending through it. The guide tube 76 is mounted on a bracket 77 clamped to the standard 40 and provided, as shown in Fig. 7, with spring-pressed jaws or blades 78 coöperating to form a clutch which permits upward, but prevents downward movement of the anchor wire. The rods 74 are tied together by a cross-bar 79 adjustably secured to them, and the anchor wire feeds up to the cutters through the tubular guide 75, the guide tube 76 between the clutch jaws 78, and through a V-shaped groove in the cross-bar 79 from a reel of wire carried between spring-pressed reel pinions 80 mounted in a bracket on the foot piece 41. The upward movement of the cross-head 73 causes the cutters 70 to grip the wire and carry it up until at the end of the movement the cutters enter the flaring end of the guide channel and are thereby brought together assisted by the thrust of the links 72, to cut the wire and leave an anchor of the proper length fixed in the glass tube in the holder. As the cross-head drops back the cutters open, and the anchor wire projecting from the guide tube 76 is prevented from dropping back by the jaws 78.

Figure 12:
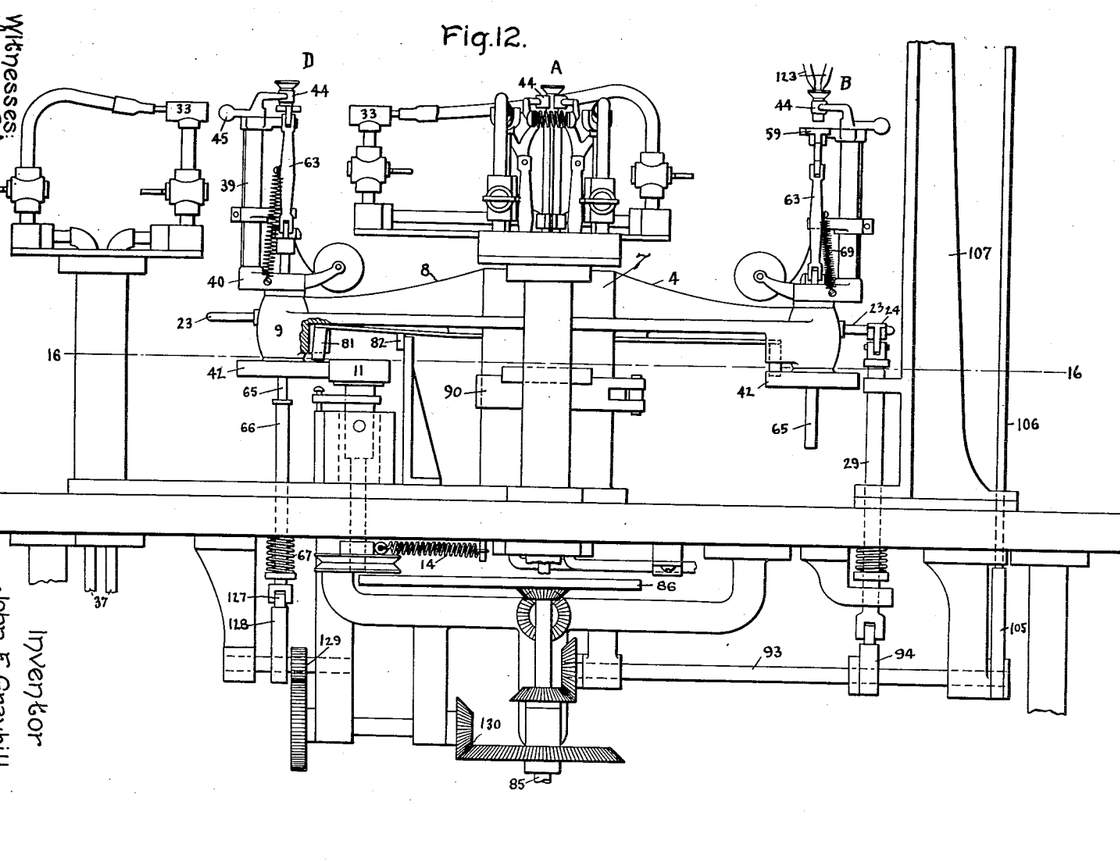
Fig. 12 a view in elevation, with one part in section, of a complete automatic stem making machine.
Figures 18, 19, 20:
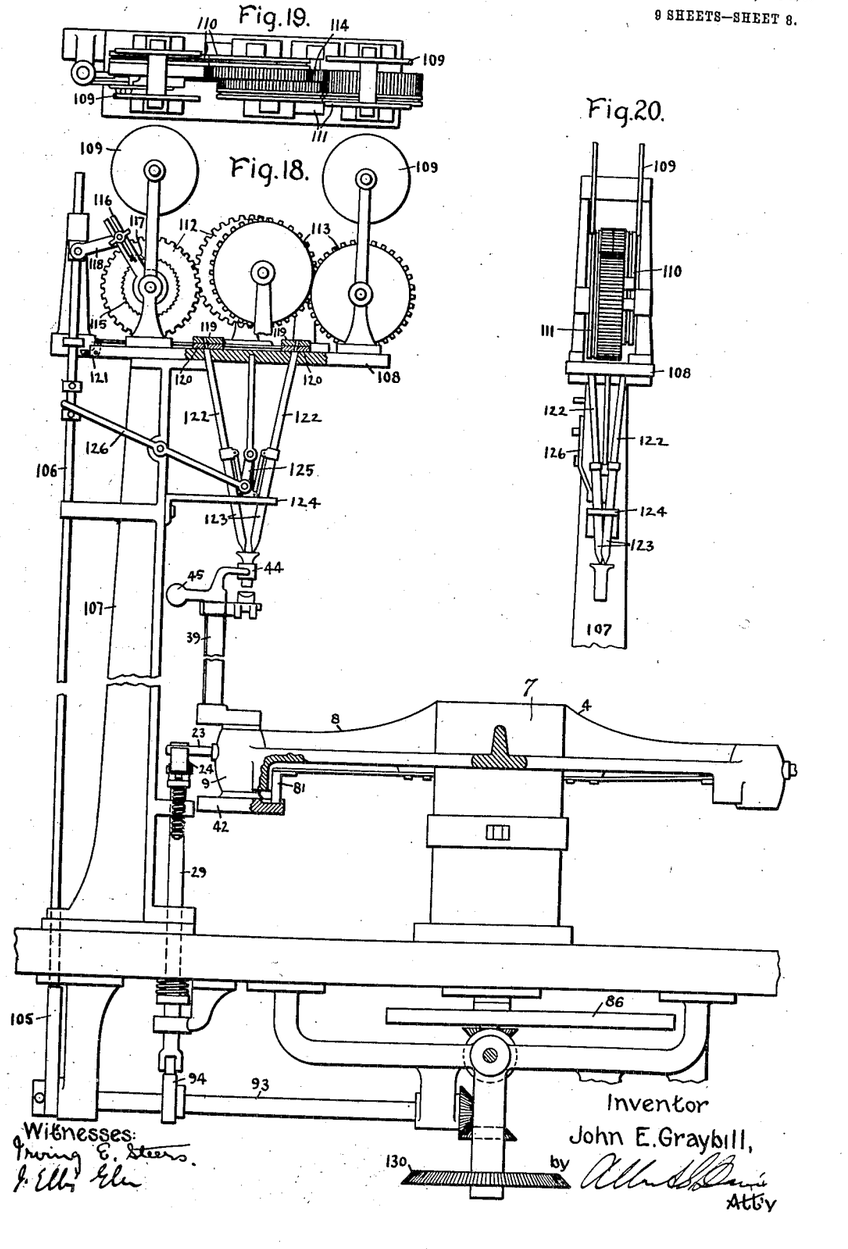
Fig. 18 a partial view of the machine showing the automatic feed mechanism for leading-in wires in elevation.
Fig. 19 a plan view.
Fig. 20 an end view of the feed mechanism shown in Fig. 18.

The rotatable frame 4 moves in a clockwise direction and it is desirable that the operating head be stationary at certain positions, particularly A and B, in order that the tube to be operated upon may be inserted between the jaws 44 and the wires placed in position in the tube. In these positions of the rotatable frame 4 the operating head is held stationary by a spring-pressed pawl 81 arranged, as shown in Figs. 1, 12 and 18, to engage a notch in the driving wheel 42 of the operating head and thereby lock the operating head stationary.
As the rotatable frame moves to the positions C and D, in which positions it is desirable that the head should rotate, the spring-pressed pawl 81 encounters a lifting roller 82 mounted upon a stationary support 83 in such position that it lifts the pawl out of engagement with the driving pulley 42 and permits the friction wheel 11 to drive the pulley and thereby rotate the operating head when the friction wheel 11 and the driving pulley 42 come into engagement.

Figure 13:
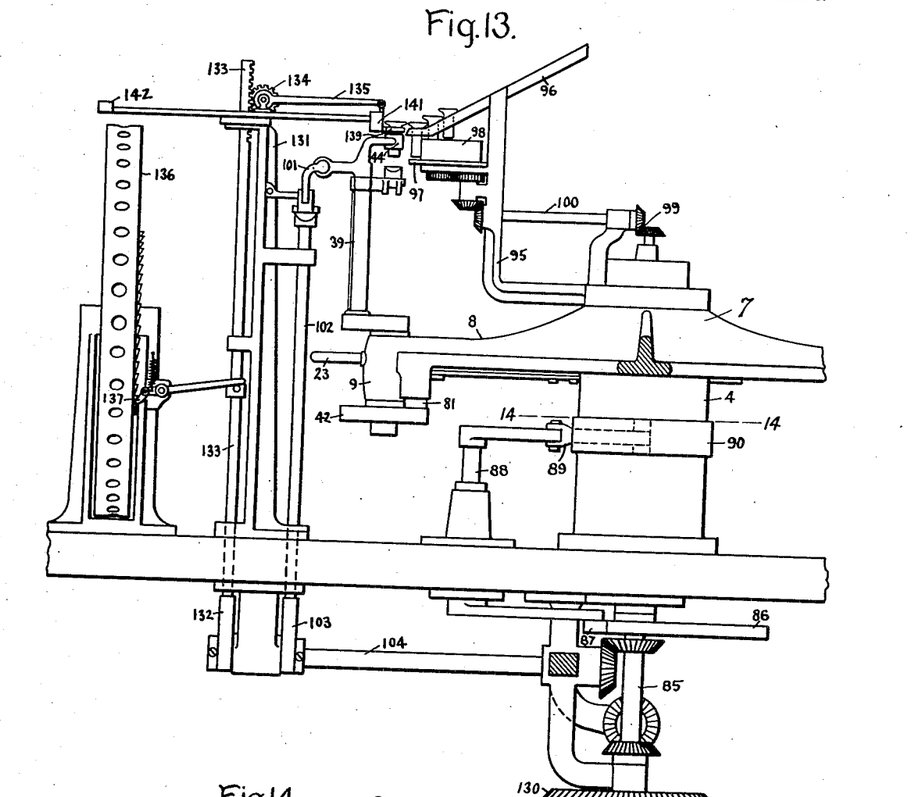
Fig. 13 a view of part of the machine shown in Fig. 12, with the operating head in the first or charging and discharging position.
Figure 14:
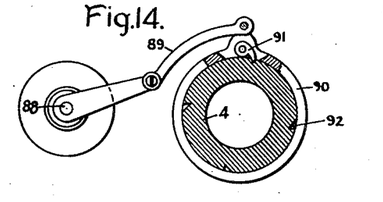
Fig. 14 a cross-section on the line 14-14 of Fig. 13 showing the ratchet mechanism.
Figure 15:
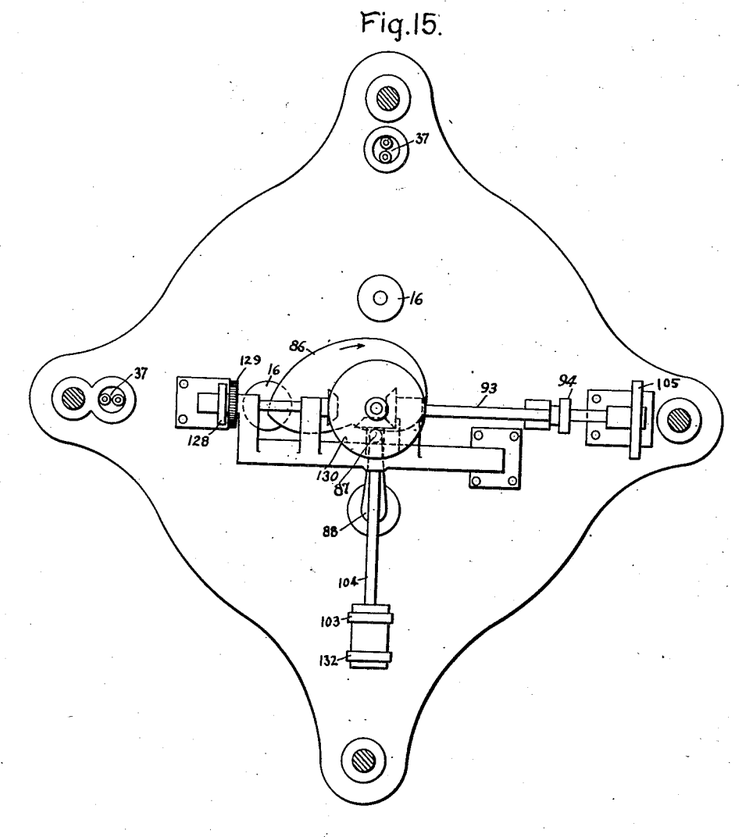
Fig. 15 a bottom plan view of Fig. 12, showing the driving mechanism.

In order that the operating head at the position D containing the completed stem may be in such a position when it reaches position A that the operator can quickly open the jaws 44 by means of the fork 58, an auxiliary actuating mechanism for rotating the head, preferably a friction band 84, is mounted in a position to engage the driving pulley 42 and thereby rotate the operating head until the spring-pressed pawl 81, which is now released from the lifting roller 82, will drop into the notch in the driving pulley 42 and thereby lock the operating head stationary.
The machine above described enables the operator to insert wires in the tubes rapidly and accurately without the exercise of any particular skill, but requires the operator to place the tubes and leading-in wires in position and to remove the completed stems. It is desirable in order to save expense to make all the various operations automatic and in accordance with my invention this result is attained by adding to the machine above described an automatic mechanism for placing the leading-in wires in position and an automatic mechanism for removing the completed stems, these mechanisms and the machine being operated in proper sequence by any suitable operating mechanism, such as gearing and cams. The preferred arrangement is shown in Fig. 12 in which a stem making machine, substantially the same as that shown in Figs. 1 to 11, is actuated by a vertical driving shaft 85 provided with means for giving the rotatable frame 4 an intermittent motion to move the operating heads from one position to the next. Various types of intermittent gearing may be used between the driving shaft and rotatable frame, but the preferred form, as shown in the drawings, comprises a cam 86 having an outline best shown on Fig. 15 and mounted as best shown in Fig. 13, on the upper end of the driving shaft 85 to actuate by means of a roller 87 a rock shaft 88 mounted in and extending through the table 1 and connected at its upper end by means of a link 89 to a movable ring 90 mounted concentric with the pedestal 3 and carrying a pawl 91 which engages four notches or ratchet teeth 92 cut in the hub of the frame 4. The rotation of the cam 86 causes an oscillation of the ring 90, and as a result of the engagement of the pawl with the ratchet the rotatable frame is moved one fourth of a revolution by each revolution of the driving shaft 85.

The rotatable frame is held stationary in each of its four positions by means of the projections 23 and the catch 24, and is released at the proper intervals by the downward movement of the operating rod 29, which is brought about automatically by means of a cam shaft 93 supported in suitable bearings on the table 1 and driven from the shaft 85 and provided with a cam 94 which engages the lower end of the operating rod 29 to actuate it at the proper intervals.

Figure 16:
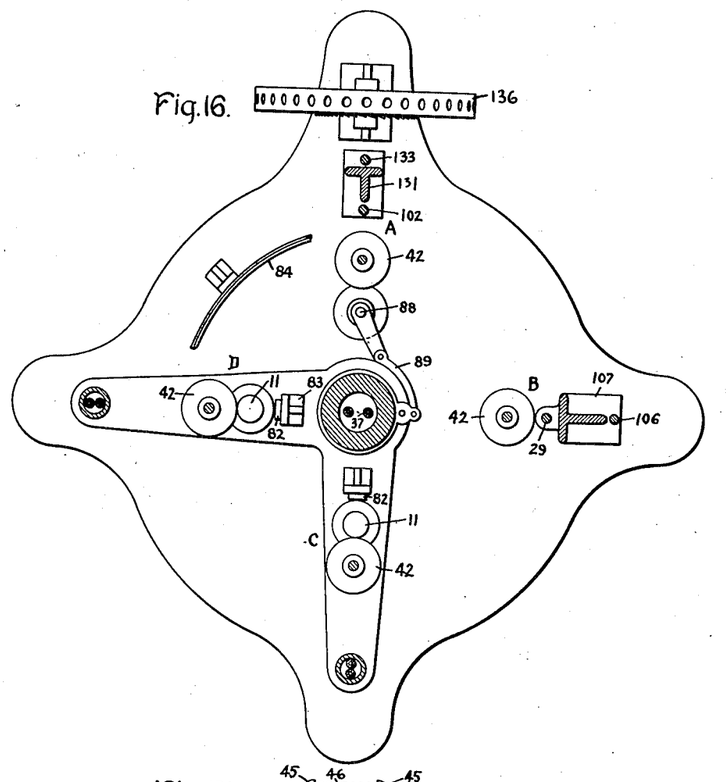
Fig. 16 a cross-section of Fig. 12 on the line 16—16, looking down on the machine, and showing the delivery wheel 136 in elevation.
Figure 17:
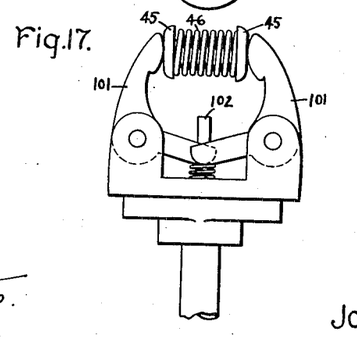
Fig. 17 a detail in elevation.
Figure 21:
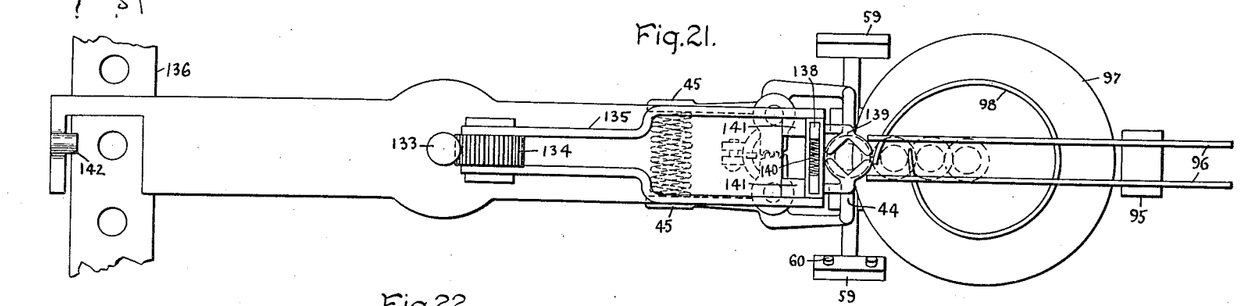
Fig. 21 a plan view of the loading and discharge mechanism.

The operation is best understood by following one operating head through a complete cycle, since all of the heads go through the same cycle in succession. While the frame and the particular operating head chosen are stationary the tubes which are already flanged are placed in position between the jaws 44 on the operating head in the position A as shown in Fig. 16. The feeding mechanism for the tube may be of any suitable automatic type and the form shown in the drawings comprises a bracket 95 mounted on the pedestal 3 and carrying an inclined rack or guide 96 down which the flanged tubes slide as shown in Fig. 13. The tubes are delivered one at a time into the jaws 44 by any suitable feeding mechanism which is preferably in the form shown in Figs. 13 and 21, and comprises a rotatable disk 97 carrying on its face a spiral rib 98 proportioned as shown in Fig. 21 to engage the tubes one at a time to move one tube from the end of the rack or guide 96 and place it between the jaws 44. The disk 97 is driven in definite time relation with the rotatable frame 4 by means of gearing 99 which connects the driving shaft to a countershaft 100 mounted in the bracket 95 and geared to the disk 97 to move it at the proper rate. The jaws 44 are opened at the proper time to receive the tube fed forward by the feeding mechanism by means of a modified form of the fork 50 in which bell crank pivoted jaws 101 are moved into engagement with the handles 45 to press them together and open the jaws by an operating rod 102 which is moved at the proper time by a cam 103 mounted on a cam shaft 104 geared to the driving shaft 85. The parts are so timed that the jaws 101 force open the jaws 44, the spiral rib 98 then forces a tube between them, and the handles 45 are then released by the action of the cam 103 on the operating rod 102, thereby leaving the tube in the proper position between the jaws 44.

The next step of the operation takes place when the rotation of the cam 86 causes the rotatable frame 4 to move one fourth of a revolution to bring the operating head to the next position B where the frame is again held stationary by the catch 24. In this position the leading-in wires are introduced into the tube held between the jaws 44 by any suitable automatic mechanism driven in proper time relation to the driving shaft 85. The specific form of mechanism for placing the leading-in wires in position, as shown in the drawings, is actuated from a cam 105 mounted on the cam shaft 93 and arranged to reciprocate an actuating rod 106 which operates the leading-in wire mechanism. The leading-in wire mechanism is mounted upon a pedestal 107 to the top of which is secured a base-plate 108 on which the various parts of the leading-in wire mechanism are mounted. The leading-in wires are mounted on reels 109 and are fed down from each reel by means of two sets of feed rollers 110 and 111, one set of feed rollers being driven by intermeshing gears 112, and the other by intermeshing gears 113. All of the feed rollers are driven from one of the gears 112 and in order to feed both of the wires in the same direction an idler gear 114 is placed in mesh between one of the gears 112 and one of the gears 113. As shown in Fig. 18 the feed rollers are actuated at the proper time and to the required extent by means of a ratchet 115 rigidly connected to one of the gears 112 and intermittently moved by a rocking arm 116, which moves about a pivot concentric with the axis of the ratchet wheel and carries a pawl 117 for engaging the wheel. The arm 116 is rocked from the actuating rod 106 by means of a link 118 connected to the arm through a pin and slot connection, which permits the throw of the arm to be varied for the purpose of changing the extent of the movement of the feed rollers and thereby the length of wire fed from the reels 109.

Figure 24:
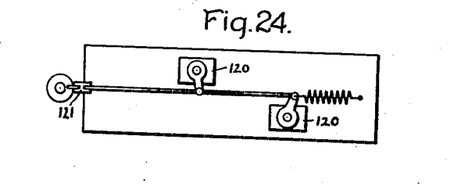
Fig. 24 a plan view of the cutters used in the mechanism shown in Fig. 18.

The length of the leading-in wires is determined by the extent of movement imparted to the feed rollers, and at the conclusion of the movement of the feed rollers both wires are cut off by any suitable type of cutting mechanism, the preferred form being that shown in the drawings in which the wires feed through openings in the stationary cutter blocks 119 and through corresponding openings in the movable cutter blocks 120 which cut off both leading-in wires after the wires have been fed forward. The movable cutter blocks are actuated from the actuating rod 106 by means of a collar which engages a bell-crank lever 121 connected to the movable cutter blocks and thereby cuts the wires, as shown in Fig. 24.

After the leading-in wires have been cut to the proper length they are placed in the proper position in the tube by any suitable delivery mechanism, the preferred form being that shown in the drawings in which stationary delivery guides or tubes 122 are carried by a base-plate 108 in a position to receive the leading-in wires and telescope within movable delivery tubes 123 which are guided by a bracket 124 on the pedestal 107 into a position to place the leading-in wires in proper relation to each other within the glass tube in the holder. As shown in the drawings, the lower ends of the movable delivery tubes enter the interior of the glass tube, where the leading-in wires are placed, and in order to permit the movement of the tube and operating head to the next position the movable delivery tubes are lifted out of the glass tube by any suitable mechanism which is shown in the drawings as comprising a cross-head 125 slidably mounted on a vertical guide rod carried by the base-plate 108 and connected by pivoted links to each of the movable delivery tubes. The movable delivery tubes are moved up and down by means of a pivoted lever 126 connected at one end to the cross-head 125 and actuated from the other end by collars on the actuating rod 106.

The operation of the leading-in wire feed mechanism above described is as follows: As the rotating head carrying the glass tube comes to rest in position B, the actuating rod 106 is lifted by the cam 105 thereby lowering the delivery tubes 123 into the glass tube and at the same time rotating the feed rollers through the ratchet wheel to feed forward the leading-in wires from the two reels. At the conclusion of the upward movement of the actuating rod proper length of the leading-in wire has been measured off from each reel and as the rod descends the movable cutter blocks are actuated through the bell-crank lever 121, both leading-in wires are cut off to the proper length and drop through the delivery tubes into proper position in the glass tube. The continued downward movement of the actuating rod 106 lifts the movable delivery tubes 123 out of the glass tube, leaving the leading-in wires in the proper position and the operating head free to move to the next position. The next rotation of the driving shaft causes the rotatable frame 4 to move to position C in which position it is held stationary with the pawl 81 lifted while the operating head is rotated by one of the friction wheels 11 which is in engagement with the driving wheel 42. In this position the flame of the preliminary burners is directed upon the glass tube and the temperature of the glass tube is raised slowly to avoid breakage. After the tube has received the preliminary heating the frame 4 is again moved one-quarter of a revolution to position D where the pawl 81 is again lifted while the driving wheel 42 again engages the friction wheel 11 and the operating head is rotated with the glass tube between the two sets of burners which give the final heating. In this position the tube is raised to such a temperature that the glass becomes plastic, and at the proper time the sliding rod 65 is automatically raised by any suitable mechanism to move the anchor wire into position in the glass tube and to cause the forming dies to approach each other and seal the glass around the leading-in wires and the anchor wire in the same manner as in the machine shown in Figs. 1 to 11, thereby forming a complete stem. The sliding rod 65 is moved at the proper time by the actuator 66 which in the automatic machine has a roller 127 on the lower end and is lifted by a cam 128 mounted on a cam shaft driven from the driving shaft 85 by gearing 129 and 130. The cam 128 is proportioned and timed to move the sliding rod 65 to its uppermost position and to permit it to return to the lowermost position during the time the frame is stationary with the operating head rotating in position D.

Figures 22, 23:
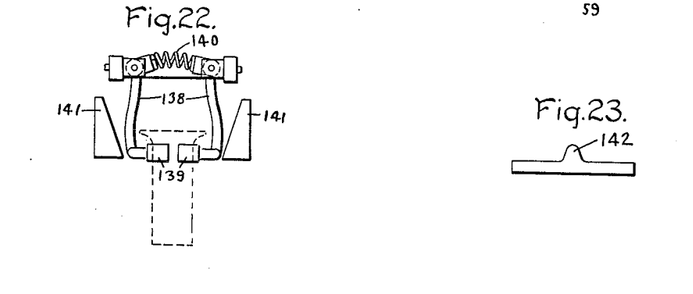
Fig. 22 an end view of part of the discharge mechanism shown in Fig. 21.
Fig. 23 a detail.

At the conclusion of the operations in position D the stem is completed and is ready to be removed from the machine by any suitable automatic discharge mechanism, which may be constructed as shown in Figs. 13, 21, and 22. The discharge mechanism is mounted on a pedestal 131, as shown in Fig. 13, and is actuated from a cam 132 on the cam shaft 104 by a reciprocating actuating rod 133, the upper end of which is made in the form of a rack engaging a pinion 134 arranged to swing an arm 135 through a half circle to remove the finished stem from the operating head and deposit it in a delivery mechanism, which is shown in the drawings in the form of a delivery wheel 136 having recesses in the periphery and given a step by step motion by means of a ratchet wheel engaged by a pawl 137 operated by the actuating rod 133. As shown in Figs. 13 and 21, the delivery wheel is placed at one end of the travel of the delivery arm 135, while the frame 4 brings the finished stem into position beneath the delivery arm at the other end of its travel. The completed stem is seized and lifted from between the jaws 44 by means of grippers 138 made in the form of bell-cranks pivotally mounted on the end of the delivery arm 135 and having gripping jaws 139 for engaging the stem. The grippers are controlled by a spring 140 which, as shown in Fig. 22, tends to hold the jaws of the grippers together when the spring is on one side and apart when the spring is on the other side of the line joining the pivots of the grippers. Stationary cams 141 are placed on each side of the grippers 138 as shown in Fig. 22, and the parts are so proportioned that as the delivery arm swings down into the position shown in Fig. 13 the gripping jaws pass over the flange of the stem and are then by the action of the cams 141 brought into engagement with the stem beneath the flange, as shown in Fig. 22. The spring 140 for controlling the grippers is arranged to hold the grippers either open or closed and after the cams have thrown the grippers into engagement with the stem, the spring holds them in that position with a grip strong enough to lift the completed stem out of the jaws 44, which are opened at the proper time by the cam 103. As the actuating rod 133 drops back after having been lifted by the cam 132 the delivery arm lifts the completed stem through a half circle and brings the spring 140 between the grippers against a stop 142, which throws the spring to the other side of the line joining the pivots of the grippers and thereby opens the grippers to deposit the stem in one of the recesses in the delivery wheel 136, which by a step by step motion eventually delivers it where desired.

My invention may be embodied in many other forms than that shown and described, and I therefore do not wish to be restricted to the exact form shown but intend to cover by the appended claims all changes and modifications within the spirit and scope of my invention.

What I claim as new and desire to secure by Letters Patent of the United States, is,—

1. In a stem-making machine, the combination with automatic positioning mechanism for placing the component parts of a stem in proper relation to each other, of a sealing device for securing said parts to each other, and common operating means arranged to actuate said positioning mechanism and said sealing device in succession.

2. In a stem-making machine, the combination with feed mechanism for placing loose lengths of wire in position in a glass tube to form leading in wires, of a sealing device for sealing said wires into said tube, and common operating means arranged to actuate said feed mechanism and said sealing device in sequence.

3. In a stem-making machine, the combination with a holder for positioning the component parts of a stem, of feed mechanism for placing said parts in position in said holder, a sealing device for uniting said parts to form a stem, and common operating means arranged to actuate said feed mechanism and said sealing device in sequence.

4. In a stem-making machine, the combination with a stem holder for positioning the component parts of a stem, of a plurality of feed mechanisms for placing the component parts of a stem in said holder, said feed mechanisms and said holder being relatively movable, and means for successively bringing said holder and each of said feed mechanisms into operative relation in predetermined sequence.

5. In a stem-making machine, the combination with a movable stem holder, of a feed mechanism for each of the component parts of a stem, and common operating means arranged to bring said holder and each of said feed mechanisms into operative relation to each other in succession and to actuate each of said mechanisms to place a part of a stem in said holder.

6. In a stem-making machine, the combination with a movable stem holder, of automatic feed mechanism for placing a tube in said holder, automatic wire feeding mechanism for introducing wires into said tube, and actuating means arranged to bring said holder into operative relation to each of said mechanisms and to actuate each of said mechanisms to place a part of a stem in said holder.

7. In a stem-making machine, the combination with a movable stem holder, of an automatic stem feeding mechanism for placing a tube in position with said holder, automatic wire feeding mechanism for placing wires in position in said tube, a sealing device for sealing said wires into said tube, and common actuating means arranged to move said holder into operative relation to each of said mechanisms and to operate each of said mechanisms and said sealing device.

8. The combination with automatic feeding mechanism for delivering a tube, of a rotatable carrier, a stem holder for receiving and gripping a tube and mounted on said carrier eccentric to the axis of rotation thereof in position to be carried into and out of relation to said feeding mechanism by the rotation of said carrier, and common actuating means for moving said carrier to bring said holder into operative relation to said feeding mechanism and for actuating said feeding mechanism and for operating said holder to receive and grip a tube while said holder is in operative relation to said feeding mechanism.

9. In a stem making machine, the combination with a movable carrier and a stem holder mounted on said carrier, of a tube rack mounted adjacent the path of said holder, transfer mechanism for transferring a tube from said rack into said holder when actuated, and common actuating means for said carrier and said transfer mechanism arranged to maintain said holder stationary in juxtaposition to said tube rack and to actuate said transfer mechanism while said holder is stationary.

10. In a stem making machine, the combination with a movable carrier and a plurality of sets of yielding jaws mounted on said carrier to hold the stems, of feed mechanism for placing a tube in each set of jaws, a separator for opening each set of jaws and common actuating means connected to said carrier to bring each set of jaws into operative position to said feed mechanism and said separator and for actuating said separator and said feed mechanism in sequence to place a tube between the jaws.

11. In a stem-making machine, the combination with a stem holder, of a tube-feeding mechanism comprising a carrier for holding a tube near said holder, and a spiral cam mounted adjacent said guide to engage one tube at each revolution and force it into said holder.

12. In a stem-making machine, the combination with yielding jaws for holding a stem and a separator for opening said jaws, of a tube rack in alinement with said jaws, a feed cam mounted adjacent said rack to feed a tube from said rack between said jaws, and common operating means arranged to actuate said separator and said feed cam in succession.

13. In a stem-making machine, the combination with a rotatable stem holder, of feed mechanism for placing a tube in position in said holder, and means for locking said holder stationary in position to receive said tube.

14. In a stem-making machine, the combination with a movable carrier and a stem holder movably mounted on said carrier, of actuating means for moving said stem holder at predetermined points in the path of said carrier, locking means controlled by said carrier for holding said stem holder in definite relation to said carrier at other points, and auxiliary actuating means for moving said stem holder at said other points into engagement with said locking means.

15. In a stem-making machine, the combination with a movable carrier and rotatable stem holders mounted on said carrier, of actuating means for rotating said holders at predetermined points in the path of said carrier, locking means controlled by said carrier for holding said stem holders in definite angular relation to said carrier at other points in its path, and auxiliary actuating means for rotating said holders at said other points to bring them into engagement with said locking means.

16. In a stem-making machine, the combination with a movable carrier, rotatable operating heads mounted on said carrier, and driving wheels carried by said heads, of actuating means arranged to engage said driving wheels at predetermined positions of said carrier, locking means controlled by said carrier to lock said heads in definite angular relation to the carrier, and a stationary actuating member engaged by said driving wheels between said predetermined points to rotate the operating heads until the locking device becomes operative.

17. In a stem-making machine, the combination with a movable frame and a rotatable stem holder mounted on said frame, of a stationary feed mechanism mounted adjacent the path of said holder to feed a tube into position in said holder, and locking means controlled by said frame to lock said holder stationary in a position to receive a tube.

18. In a stem-making machine, the combination with a movable carrier and a plurality of stem holders mounted on said carrier, of a tube-feeding mechanism for placing a tube in each of said holders, and means for stopping each holder adjacent said mechanism in position to receive a tube.
19. In a stem-making machine, the combination with a movable carrier and a rotatable stem holder mounted on said carrier, of tube-feeding mechanism and wire feeding mechanism mounted adjacent to the path of said holder, and automatic means arranged to stop said carrier with said holder in operative relation to a feed mechanism and to simultaneously operate the feed mechanism.
20. In a stem-making machine, the combination with a movable carrier and a rotatable holder mounted on said carrier, of locking means controlled by the movement of said carrier to lock said holder against rotation at predetermined points in the movement of the carrier, feeding mechanism at said points for placing the component parts of a stem in said holder, and common operating means for said carrier and said feeding mechanism.

21. In a stem-making machine, the combination with a movable carrier and a rotatable stem holder mounted on said carrier, of feed mechanisms for placing the component parts of a stem in said holder mounted adjacent to the path of said holder, a sealing device for uniting said parts to form a stem, locking means controlled by said carrier for locking said holder against rotation when in operative relation to said feed mechanisms, and common operating means for said mechanisms and said sealing device.

22. In a stem-making machine, the combination with a movable stem holder, of a plurality of feed mechanisms mounted adjacent the path of said stem holder and each arranged to place a different component part of a stem in said holder, and common actuating means arranged to impart a step-by-step movement to said holder to bring it into operative relation with each of said mechanisms in succession and to actuate each mechanism when in operative relation to said holder.

23. In a stem-making machine, the combination with a stem holder for positioning the component parts of the stem, of automatic means for positioning in a stem tube in said holder a plurality of loose leading-in wires with their ends projecting beyond the top and the bottom of said tube.

24. In a stem-making machine, the combination with a stem holder for positioning the component parts of the stem, of wire feeding mechanism arranged to feed simultaneously a plurality of continuous lengths of wire toward said holder, a wire cutter actuated in definite time relation to said feeding mechanism to cut an equal length from each of said wires, and guides whereby said lengths of wire are conveyed by gravity into position in the stem tube.

25. In a stem-making machine, the combination with a stem holder for positioning the component parts of the stem, of a guide which has its lower end positioned to discharge a loose wire into the stem tube in position for a leading in wire, a wire feeding mechanism for feeding a wire into the upper end of said guide, a wire cutter, and common operating means for intermittently actuating said wire feeding mechanism to feed a predetermined length of wire toward said guide and for actuating said cutter while the wire feeding mechanism is inoperative.

26. In a stem-making machine, the combination with a movable stem holder for positioning the component parts of the stem, of an automatic delivery mechanism arranged to place a plurality of wires in position in a tube in said holder, and operating means arranged to bring said holder into operative relation to said mechanism and simultaneously actuate said mechanism to place wires in said tube.

27. In a stem-making machine, the combination with a stem holder for positioning the component parts of the stem, of automatic wire feeding mechanism arranged to feed a wire into position in said stem, and means for varying the length of wire fed by said mechanism.

28. In a stem-making machine, the combination with a stem holder for positioning the component parts of the stem, of wire feeding rollers arranged to feed simultaneously a plurality of wires toward the tube in said holder, and actuating means arranged to move said feed rollers intermittently to feed said wires into the tube in said holder.

29. In a stem-making machine, the combination with a movable stem holder for positioning the component parts of the stem, of a guide for the wire movable into and out of the tube in said holder, and common operating means for moving said holder and said guide in definite time relation.

30. In a stem-making machine, the combination with a stem holder for positioning the component parts of a stem, of a wire delivery mechanism comprising wire guides movable into and out of the tube in said holder.

31. In a stem-making machine, the combination with a stem holder for positioning the component parts of the stem, of guides having vertical wire channels with their lower ends discharging into a tube held in said holder, and automatic means for delivering loose wires of predetermined length into the upper ends of said channels and thence into the tube.

32. In a stem-making machine, the combination with a stem holder for positioning the component parts of the stem, of delivery mechanism comprising a telescoping tube movable into and out of the tube in said holder and positioned to place a wire inside the tube in said holder.

33. In a stem-making machine, the combination with a sealing device for sealing a wire into a tube, of an operating member for actuating said sealing device, and a cutter mounted on said member and actuated to cut said wire when carried into a predetermined position by said member.

34. In a stem-making machine, the combination with a sealing device for sealing a wire into a tube comprising wire feeding mechanism arranged to feed a continuous length of wire into said tube, of a movable operating member for actuating said sealing device, cutting jaws pivotally mounted on said member to cut the wire, and means whereby said jaws are forced into engagement to cut the wire at the end of the movement of said member.

35. In a stem-making machine, the combination with a movable sealing device for sealing a wire into a tube comprising a support for a reel of wire and a wire feeding mechanism for feeding wire from said reel into said tube, of a wire cutter yieldingly mounted on said sealing device to engage said wire between said feeding mechanism and said tube and actuated to cut the wire by relative movement of said cutter and said device, and operating means for actuating said sealing device and then causing relative movement of said cutter and said device to cut the wire.

36. In a stem-making machine, the combination with a sealing device for sealing a wire into a tube and burners for heating the tube in said device, of a wire cutter normally out of range of said burners and movable toward said tubes into operative position adjacent said burners, and common operating means arranged to actuate said sealing device and to move into operative position and to actuate said cutter.

37. In a stem-making machine, the combination with a sealing device for sealing a wire into a stem, of a sliding support movable along said wire, cutting blades mounted on said support to engage said wire, and operating means arranged to move said support to a predetermined point and to operate said cutters at said point.

38. In a stem-making machine, the combination of a stem sealing device comprising pressing members for engaging a tube in said device, an actuating member for said pressing members, a wire feed mechanism actuated by said actuating member to feed a wire into the tube in said device, and a wire cutter mounted on said actuating member and actuated at the end of the movement of said actuating member.

39. In a stem-making machine, the combination with a stem sealing device comprising a movable actuating member for said device and a wire feeding mechanism actuated by said member to feed a wire into a tube in said device, of a wire cutter yieldingly mounted on said member to engage the wire, and a stop which engages said cutter at the end of the movement of said wire feeding mechanism, to force said cutter toward said member and thereby cut the wire.

40. In a stem-making machine, the combination with a stem sealing device comprising an actuating member movable to a predetermined point toward a tube held in said device and a wire feeding mechanism actuated by said member, of a wire cutter mounted on said actuating member, and means whereby said wire cutter is actuated at said predetermined point to cut the wire.

41. In a stem-making machine, the combination with a sealing device comprising a sliding cross-head for actuating said device, of a support for a reel of wire, a gripper mounted on said cross-head to engage and feed a wire toward the tube in said sealing device, and a stationary clutch arranged to engage said wire to prevent movement away from said tube.

42. In a stem-making machine, the combination with a rotatable sealing device for sealing a wire into a stem comprising feed mechanism arranged to feed a wire into said stem, of a wire cutter mounted on and rotatable with said sealing device, and operating means arranged to actuate said wire cutter at any point in the rotation of said sealing device.

43. In a stem-making machine, the combination with a rotatable sealing device comprising a slidable cross-head for actuating said device, of a support for a reel of wire mounted on said device, feed mechanism actuated by said cross-head to feed a wire from said reel into said stem, and means for moving said cross-head during the rotation of said sealing device.

44. In a stem-making machine, the combination with a stem holder comprising spring-pressed jaws, of discharge mechanism for removing a stem from between said jaws, and automatic means for opening said jaws and simultaneously actuating said discharge mechanism.

45. In a stem-making machine, the combination with a stem holder comprising spring-pressed jaws, of a separator for said jaws, automatic discharge mechanism arranged to remove a stem from between said jaws, and common operating means for actuating said separator and said discharge mechanism.

46. In a stem-making machine, the combination with a stem holder, of a conveyer mounted adjacent said holder, a movable arm having stem grippers brought into operative relation with said holder and said conveyer at different points in its path, and means for operating the grippers at said points.

47. In a stem-making machine, automatic stem discharge mechanism comprising a movable member, grippers on said member, means for yieldingly holding said grippers either open or closed, and automatic means for closing said grippers at one point and opening said grippers at another point in the travel of said member.

48. In a stem-making machine, automatic discharge mechanism comprising a movable member, grippers pivoted to said member, a spring connected to said grippers to yieldingly hold them open or closed, and cams engaged by said grippers at a predetermined point in the path of said member to close said grippers on a stem.

In witness whereof, I have hereunto set my hand this 14th day of October, 1908.

JOHN E. GRAYBILL.

Witnesses:
EDWARD J. LOUCKS,
H. G. WEEST.